F. CREEDY.
DYNAMO ELECTRIC MACHINE.
APPLICATION FILED JULY 20, 1915.
1,291,424.
Patented Jan. 14, 1919.
8 SHEETS—SHEET 1.

Fig. 1ª 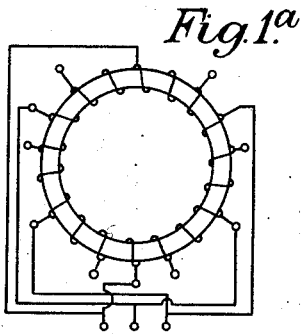
Fig. 1ᵇ 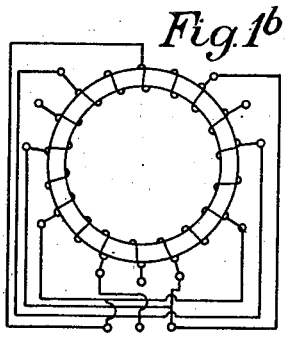

Fig. 2ª 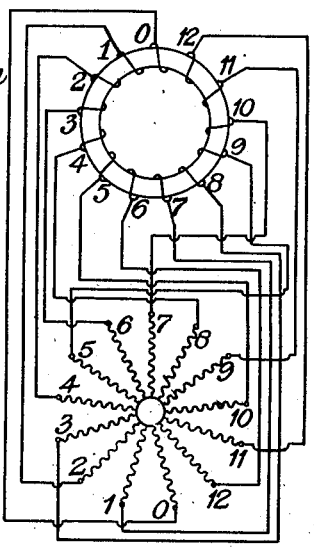
Fig. 2ᵇ 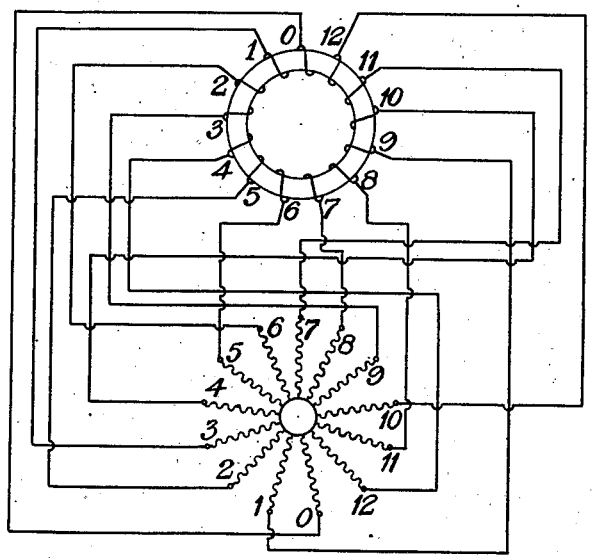
Witnesses
J. A. Sprott
F. Collins
Inventor
F. Creedy.

Inventor
Frederick Creedy,

F. CREEDY.
DYNAMO ELECTRIC MACHINE.
APPLICATION FILED JULY 20, 1915.

1,291,424.

Patented Jan. 14, 1919.
8 SHEETS—SHEET 4.

Witnesses

Inventor
F. Creedy

F. CREEDY.
DYNAMO ELECTRIC MACHINE.
APPLICATION FILED JULY 20, 1915.

1,291,424.

Patented Jan. 14, 1919.
8 SHEETS—SHEET 5.

Witnesses
J. A. Sprott
F. Collins

Inventor
F. Creedy.

F. CREEDY.
DYNAMO ELECTRIC MACHINE.
APPLICATION FILED JULY 20, 1915.

1,291,424.

Patented Jan. 14, 1919.
8 SHEETS—SHEET 6.

Witnesses
Inventor
F. Creedy

UNITED STATES PATENT OFFICE.

FREDERICK CREEDY, OF ILKLEY, ENGLAND.

DYNAMO-ELECTRIC MACHINE.

1,291,424.  Specification of Letters Patent.  Patented Jan. 14, 1919.

Application filed July 20, 1915.  Serial No. 40,910.

*To all whom it may concern:*

Be it known that I, FREDERICK CREEDY, a subject of the King of Great Britain, residing at 10 Ashburn Place, Ilkley, in the county of York, England, have invented new and useful Improvements in Dynamo-Electric Machines, of which the following is a specification.

The present invention relates to dynamo-electric machines of all types, and the main purpose of the invention is to adapt existing machines so that they become machines of variable pole number. The present dynamo-electric machines are grouped under a number of broad types, chiefly in regard to their mechanical construction and their adaptation electrically to alternating or direct current, to high or low voltages, and so forth. They all, however, are of definite pole number, that is to say, they possess a magnetic field of such a distribution as to present a particular number of poles which in most instances is absolutely invariable once the machine is built. The present invention may be stated broadly as being a generally applicable method of constructing dynamo-electric machines of variable pole number.

The first object of the invention is to construct machines of a pole number which is variable, by varying the phase difference between the zones or bands of current instead of altering the number and width of these bands. A further object of the invention is to add to machines of known types or known combinations of machines, the capability of having the number of poles varied in accordance with this invention. Another object consists in providing means for changing the phase difference between the zones or bands of current spaced around the periphery of the machine due to the windings carried by the rotor and stator suitably interconnected and operating. In accordance with the invention machines can be constructed with a variation of pole number solely limited by the number of steps of phase difference available and the number of bands or zones of current,—exactly as the voltage of an ordinary dynamo is regulated by the number of steps in its field rheostat,—but subject to the necessary condition the machines must always have an integral total number of pairs of poles.

An important development of the present invention is in its application to alternating current motors with the object of attaining variable speeds, but it will be shown hereinafter that the invention may be applied to commutator machines of both the shunt and the series type, to phase regulators, to alternating current generators, to rotary converters and frequency converters. In each case a new type of machine is produced corresponding to a known type, but with the additional feature that the pole number is variable.

More particularly defined the invention consists in varying the phase difference between the bands or zones of current by the use of a polyphase supply of a suitably large number of phases. For this purpose the conductors producing successive bands of current are connected to successive phases or alternate phases or to every third phase and so on of the polyphase supply, and thus the various polarities desired are obtained. It is obvious that these results can be produced in an ordinary ring winding, but an embodiment of the present invention is described below wherein a drum winding is so designed as to produce the same effect, a very large number of bands of current being produced without a prohibitive number of tappings upon the winding.

Embodiments of the invention are described with reference to the annexed drawings, in which the same reference characters refer to corresponding parts, and in which—

Figures 1, 1ᵃ and 1ᵇ are diagrams showing the usual way of altering the polarity of a ring winding.

Figs. 2, 2ᵃ and 2ᵇ are diagrams showing the method of this invention applied to such a winding.

Figure 16:
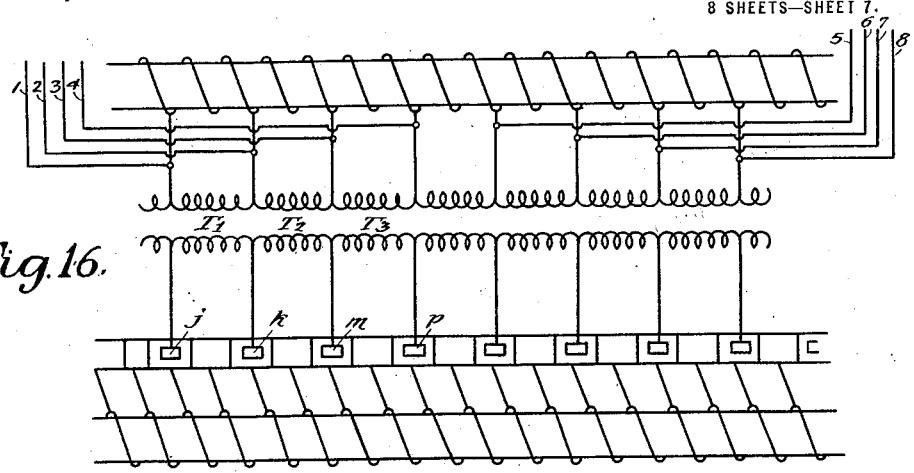
Figure 17:
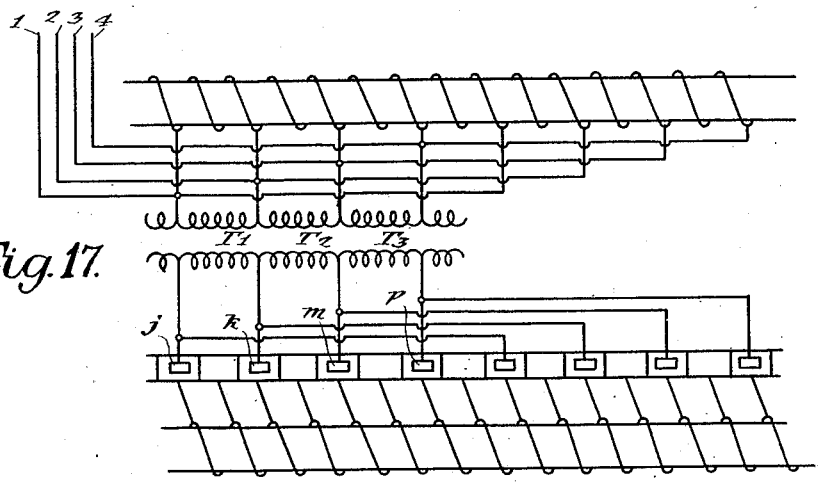

Figs. 16 and 17 similarly illustrate variable and fixed polarity shunt commutator motors.

Figure 18:
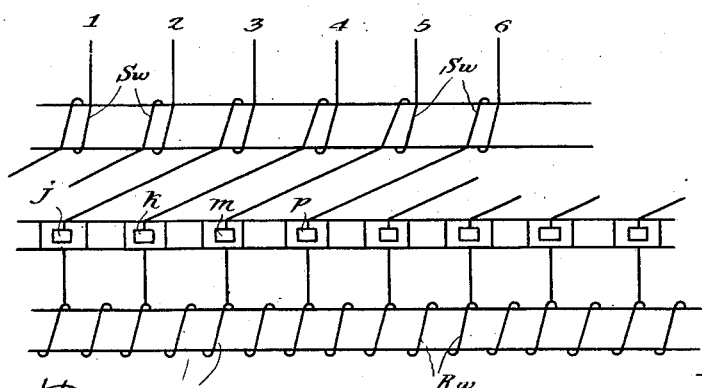

Fig. 18 is a series commutator motor according to the invention.

Figure 19:
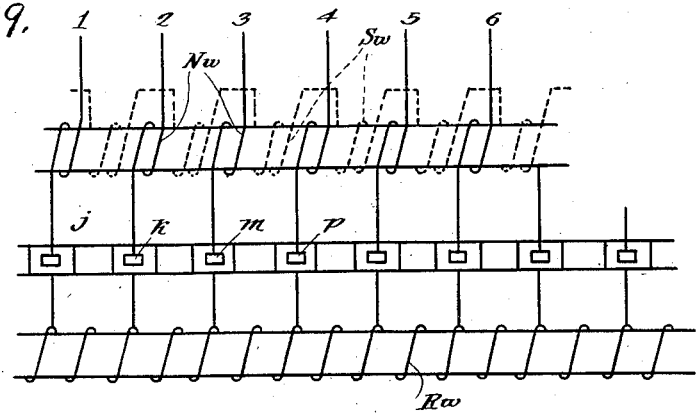

Fig. 19 is a compensated shunt conduction motor according to the invention.

Figure 20:
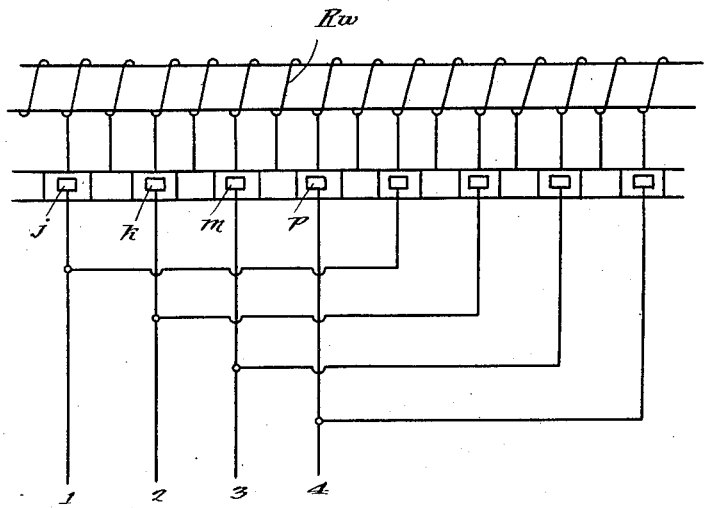
Figure 21:
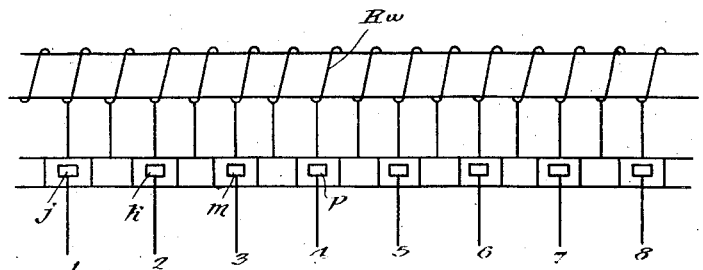

Figs. 20 and 21 illustrate respectively in diagrammatic fashion the known form of phase advancer and a variable pole phase advancer according to the invention.

Figure 1:
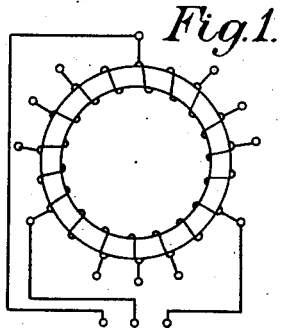
Figure 2:
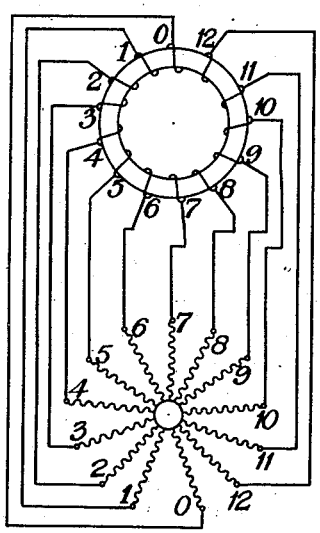

The broad idea of the invention may conveniently be explained in its application to a simple induction motor with squirrel cage secondary. Figs. 1 and 2 show diagrammatically a ring wound primary for such a motor with its connections to the supply, the term "primary" indicating here and hereinafter the winding which receives the larger power supply from the line, and "primary member" the iron structure which carries the primary winding.

At present the only method of changing pole number is that shown in Figs. 1, 1ª and 1ᵇ which depict the connections of the primary to three-phase mains for producing 2 poles, 4 poles and 6 poles respectively. It will be seen that the bands of current are reduced in width and increased in number as the number of poles increases. Moreover to produce only these pole numbers, or even only 4 and 6 poles the primary must have no less than 12 tappings. It will be noted that for the 6-pole connection some of the 4 pole tappings are useless. If it were desired to produce 8 poles also six more tappings would have to be added which would be needless for the connections shown, while of the tappings illustrated six would be unused on the 8 pole connection. But in addition to the great number of terminals and the extremely complex control necessary the variation in width and number of the current zones involves further difficulties. For if the machine is to be "balanced" these bands must be precisely similar in every respect, and while in a slotted primary member a number of slots may readily be chosen to meet this condition on one pole number, it becomes increasingly difficult or almost impossible to meet it the greater the number of poles proposed to be used. Also the voltage of supply would need to be varied for each different pole number in order to obtain satisfactory economy of material. For these reasons any wide variation of pole number in this manner is impracticable.

Figs. 2, 2ª and 2ᵇ show the method of the invention applied to a ring wound primary having thirteen tappings by the aid of a 13-phase supply. The first connection illustrated produces 2 poles—successive tappings are joined to successive phases of the supply; the next produces 4 poles—successive tappings are joined to alternate phases of the supply; the third produces 6 poles—successive tappings being joined to every third phase of the supply. No increase in the number of tappings would be necessary to produce 8 or even 10 poles. These figures make clear, too, that it is not necessary to connect a given phase of the supply to as many coils as there are pairs of poles. In fact if the number of phases is prime, as in the case illustrated, any given phase is never connected to more than a single coil whatever may be the order of connection between tappings and supply. It is therefore an advantage to employ a supply of a number of phases that has no common factor with any of the numbers of pole-pairs it is desired to produce.

Figure 3:
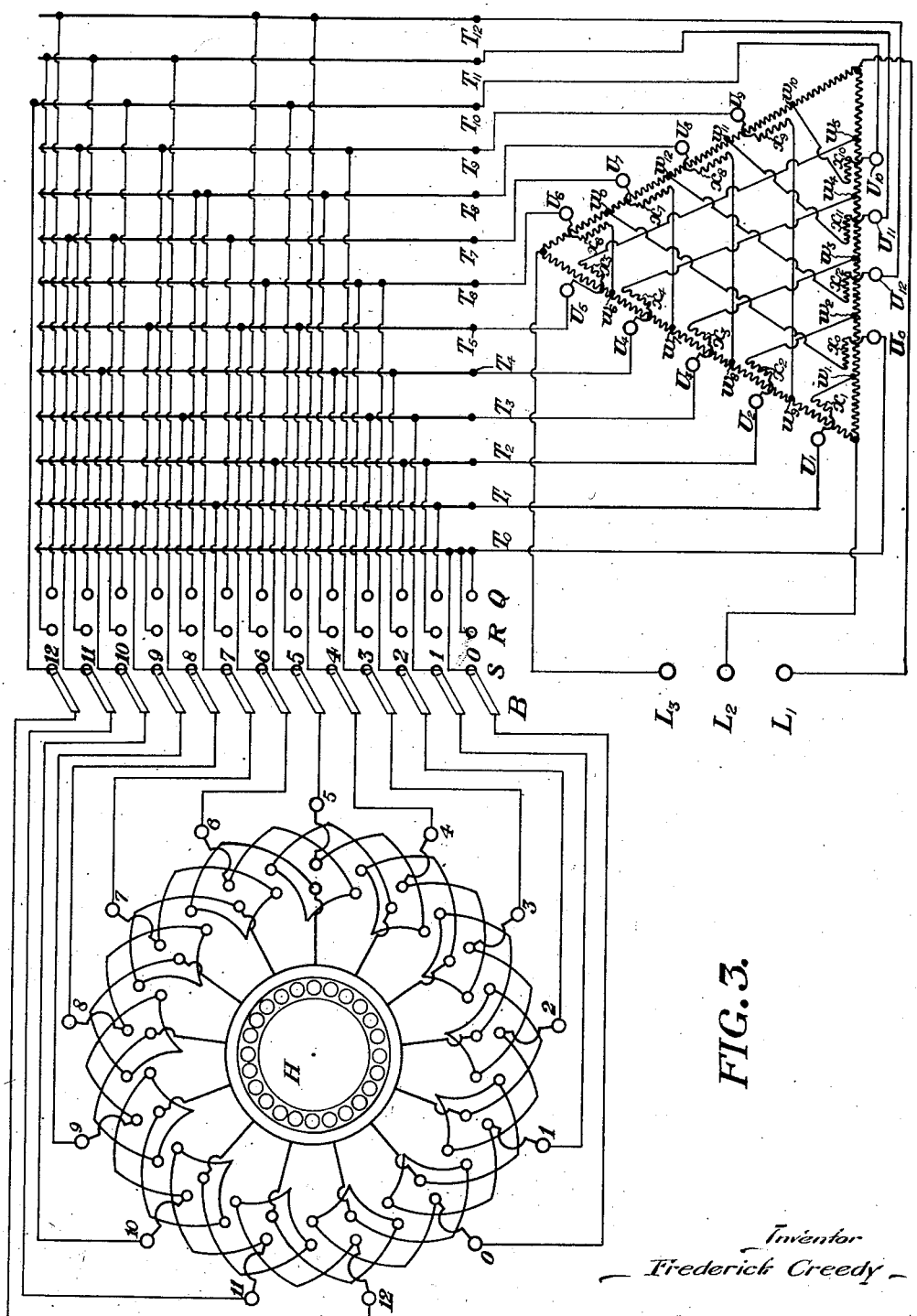
Fig. 3 is a diagram showing the application of the invention to a motor working with three different numbers of poles.

Fig. 3 shows the application of the invention to a machine having a drum-wound primary G and a squirrel cage secondary H. The primary G has thirteen tappings numbered 0 to 12, with a 13-phase supply. Fig. 3 also illustrates by way of example the method of deriving the 13 phases required from a 3-phase supply, and a form of controller adapted to provide the necessary changes of connections for three different pole numbers. It will be apparent that other pole numbers might be provided for in the same way, with the use of additional sets of contacts on the controller, arranged on the principles hereinafter set forth. The drum winding of the primary G is in two layers, and is shown sub-divided into 13 star-connected sections, each of which is joined by its tapping to a correspondingly numbered brush in the column of movable brushes B. Each section of the winding of the primary G consists of two coils or sub-sections wound into distinct slots of the primary member, and connected in series. The two coils or sub-sections of each section of the winding will thus carry currents in the same phase for all pole numbers for which the machine operates. The pitch of the coils is chosen with respect to the principles set forth below, and is such that the coils do not span an integral number of sections of the winding. The pitch shown is in fact a little short in practice for the highest possible speed, but is more satisfactory for lower speeds (higher pole numbers). It is selected however as a clear and simple example of the principles of this invention. If the connections of any section of the winding say the section from tapping marked 0, are followed out it will be seen that the lower or inner conductors belonging to this section overlap the top layer conductors belonging to two other sections, namely those connected to terminals 12 and 11. The effect of this is to produce twice as many bands of current differing in phase as there are sections in the winding, in the manner more fully explained hereinafter with reference to Figs. 4 and 5. The winding is still, however, a regular polyphase winding, that is to say, it is adapted to receive equal polyphase currents having as many phases as there are sections in the winding. The terminals numbered 0 to 12 are connected through brushes B (numbers 0 to 12) to a controller including a number of conducting rods or bus bars $T_0$ to $T_{12}$ which are supplied with current in thirteen phases. The controller has a field of fixed contacts arranged in rows, one row for each of the distinct pole numbers for which the machine is required to operate. Three such rows of contacts, Q (numbers 0 to 12), R (numbers 0 to 12) and S (numbers 0 to 12) are shown in the figure, giving connections for 2, 4 and 6 poles respectively. The moving contacts B (0 to 12) are arranged to be capable of making contact with either the row Q, row R or row S of fixed contacts, in order to change the pole number of the motor. Following the connections for the row Q, it will be seen that the terminals 0 to 12 of the drum winding sections are connected in order through the contacts Q (0 to 12) and rods $T_0$ to $T_{12}$ to successive lines of the source of polyphase supply $U_0$ to $U_{12}$, so that a two-pole field results. Following the connections of row R of fixed contacts in a similar manner, it will be seen that when the brushes B (0 to 12) bear on these contacts R, the drum winding sections 0—12 are now connected to alternate lines of the source of polyphase supply in the order $U_0, U_2, U_4, U_6, U_8, U_{10}, U_{12}, U_1, U_3, U_5, U_7, U_9, U_{11}$. This gives a four-pole field. When the brushes B (0 to 12) bear, as shown, on the contacts of row S, it will be seen that drum winding sections 0—12, are now connected to every third line of the source of polyphase supply, in the order $U_0, U_3, U_6, U_9, U_{12}, U_2, U_5, U_8, U_{11}, U_1, U_4, U_7, U_{10}$. This gives a six pole field.

The 13 phase polyphase supply may be obtained conveniently from a 3-phase supply by means of the transformer shown. This consists of a mesh-connected winding with terminals $L_1, L_2, L_3$ connected to the 3-phase supply, and with tappings at appropriate points $w_0$—$w_{12}$ on the three limbs of the winding connected to small secondary windings $x_0$—$x_{12}$ wound on different limbs of the transformer from those to which they are tapped. The ends of the secondary windings $x_0$—$x_{12}$ are connected to the respective terminals $U_0$—$U_{12}$, thus providing the 13-phase currents, as more fully explained hereinafter.

The system of wiring wherein the bus bars $T_0$—$T_{12}$ lie parallel to the field of contacts Q, R, S, each contact stud of which is connected to its appropriate bar by a direct wire, forms a very convenient and systematic method of effecting the otherwise complex wiring necessary. All the connecting wires are visible, and separate, so that defects are easily located and repairs quickly effected. The same system of course can be applied to the wiring for any number of phases and for any sets of pole numbers required, without risk of confusion or needless complication.

It may be stated here that the least number of phases which will be used in practice will always be greater than five, as with five phases or less it is impossible to obtain satisfactorily even two distinct pole numbers by the method of this invention, as on the higher pole number there would not be a sufficient number of phases per pole.

It will now be convenient to indicate the advantages of the type of drum winding shown in Fig. 3, and to show how it is derived.

Figure 4:
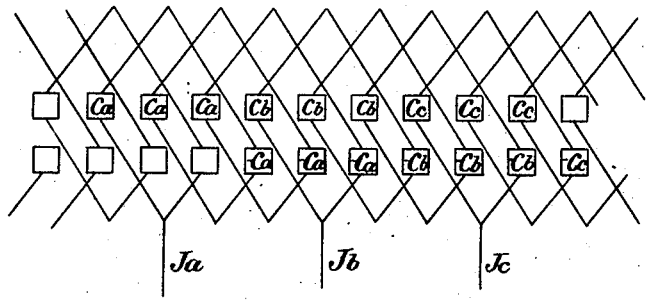
Fig. 4 shows the construction of a drum winding for the purposes of this invention in greater detail.

Fig. 4 is the ordinary diagrammatic representation of a lap winding with tappings $Ja$, $Jb, Jc \ldots$, spaced apart by an amount equal to the slot pitch of the winding. In the case shown the slot pitch is 1—4, that is to say a coil having one side in slot 1 has its other side in slot 4. Suppose the currents in the winding on opposite sides of tapping $Jb$ are —$Ca$ and $Cb$ respectively, those on opposite sides of tapping $Jc$,—$Cb$ and $Cc$ respectively and so on. All the slots embraced by the coil connected to tapping $Jb$ will have in them a bar carrying current —$Ca$ and another carrying current $Cb$, so that together they constitute a zone of current of magnitude $Cb$—$Ca$. Similarly the slots within the span of the coil joined to $Jc$ make a zone of current $Cc$—$Cb$ and so on. But the current in $Jb$ is $Cb$—$Ca$ and the current in $Jc$, $Cc$—$Cb$. So that the effect of the winding is to produce zones of current proportional in value to the current in the adjacent tapping, exactly as in the case of a star-connected ring winding. In all windings the zones or bands should preferably be identical.

If the pitch of the tappings were greater than the slot pitch the same effect would be produced only that the current zones would be separated by slots containing bars carrying equal and opposite currents.

By the methods indicated below it is possible to secure a large number of different zones with a relatively small number of tappings.

Figure 5:
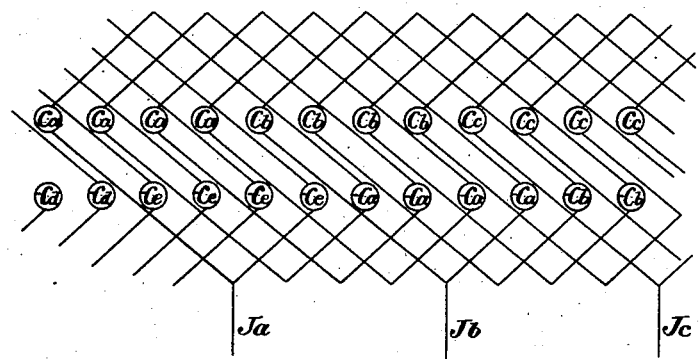
Figs. 5 and 6 show methods of obtaining in drum windings a large number of zones of current for a small number of tappings.

One method is illustrated by Fig. 5 which shows a two layer winding like that of Fig. 4 but with a slot pitch greater than the pitch of the tappings and not an exact multiple of it. The effect of this is to produce within the span of the coil joined to $Ja$ three different bands of current, viz. a band $Ca$—$Cd$, another $Ca$—$Ce$ and a third $Cb$—$Ce$, so that, in all there are twice as many zones as tappings.

In general all the tappings of the winding must be brought out to independent terminals, but where all the pole numbers it is desired to use fulfil certain conditions it is sometimes possible to reduce the numbers of terminals.

For instance if for each of the numbers of poles with which the motor is intended to work certain points in the winding are equipotential points they may be joined by equalizers and only one terminal provided for each set.

Similarly if for each of the numbers of poles there are groups of bars carrying equal currents, the bars of these groups may be united into a wave winding in place of the lap winding. It will sometimes occur that the same distribution of currents is repeated several times around the circumference of the machine, so that the bars can be connected by a wave winding having a short pitch less than the pole pitch at one end, and a long pitch spanning several pole pitches at the other.

As a concrete illustration of such a wave winding consider a 47 slot winding which is to be arranged for four, eight and sixteen poles, say. If it were to be arranged for four poles only, bars lying in slots 1—13—25—37—2 and so on would be connected in series. If it is to operate on 8 and 16 poles also bars 1—4—25—28—2, say, must be connected in series instead. The slot pitch of 1—4 is approximately one pole pitch on 16 poles but is much less than a pole pitch for four and eight poles. Briefly such a wave winding will be connected the same as a winding for the least number of poles required, but the slot pitch of the coil will be such as to suit the greatest number; the different pole numbers on which the winding is operable being so chosen that each coil of the set which is connected in series around the circumference, lies under the same pole on all the different polarities. For instance in the above example, the slot pitch of 1—4, as mentioned above, corresponds to 16 poles while the winding as a whole is connected as a 4-pole winding for there are only 4 bars in series around the circumference.

The least number of independent bars or groups or bands required in a machine which is to work with each of several given numbers of poles is the product of the number of phases in the shortest pole pitch used and the maximum number of poles used, divided by the G. C. M. of all the numbers of pairs of poles used. To secure satisfactory working it is well to have not less than two phases in the shortest pole pitch, and the number of phases in each larger pole pitch will then be more than two, though it may not be a whole number. The winding will present a number of identical sections equal to the G. C. M. of all the numbers of pairs of poles.

It will be understood that the word "bar" used here and elsewhere has the same meaning as "zone", "band" or "group" of conductors and is to be considered as including a group of conductors carrying the same current whether lying in one slot forming one side of a coil, or in several neighboring slots.

In some cases it is possible to increase the number of bars or groups on the winding without increasing the number of terminals by using a winding the slot pitch of which is equal to an odd number of pole pitches. But if such a winding is to be employed for several different pole numbers the pole numbers must be chosen within certain limits, viz., so that the number of pole pitches in every identical section of the winding is odd for every number of poles.

Figure 6:
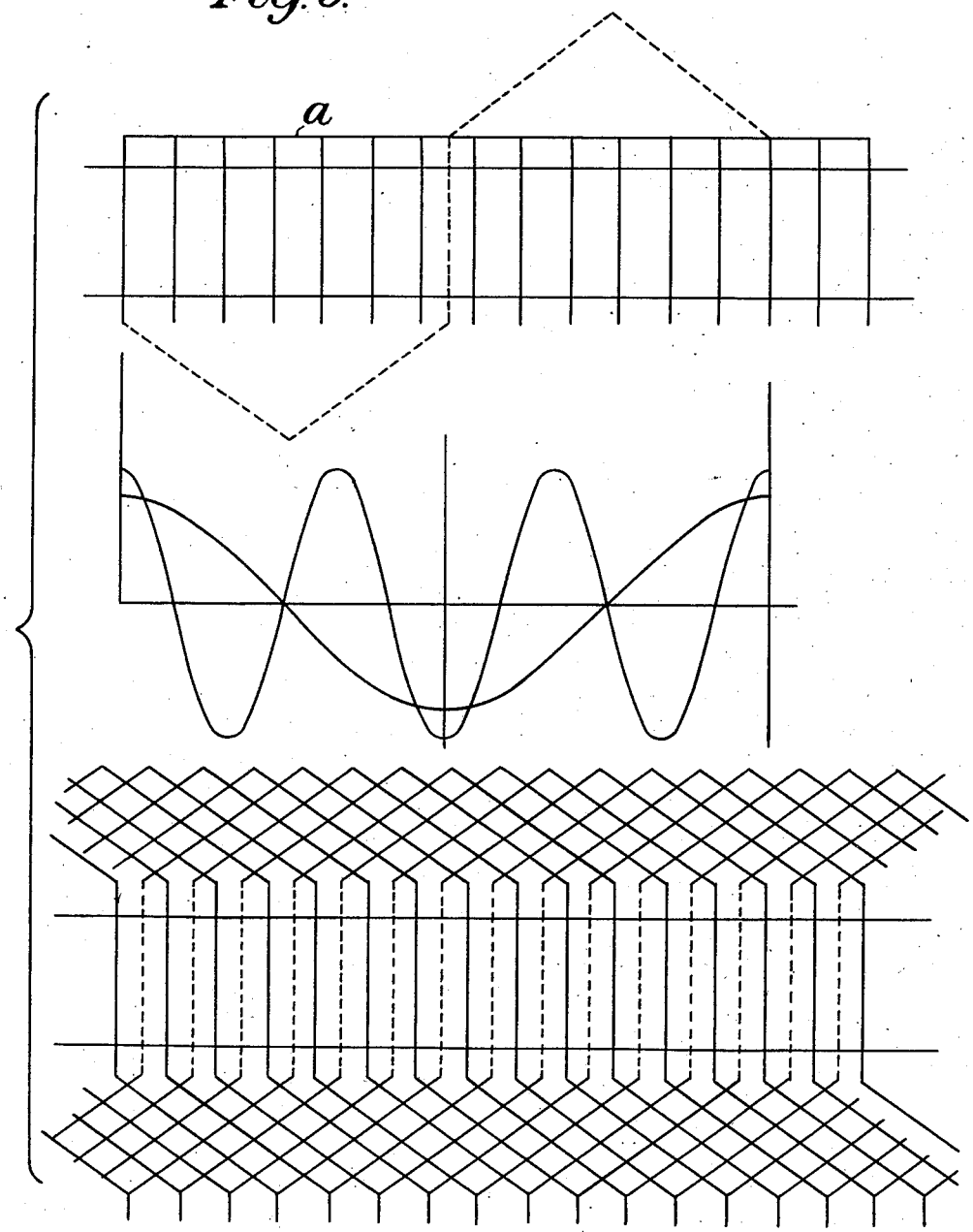

This will appear from a consideration of the elementary winding shown in Fig. 6, which consists of a number of bars each joined at one end to an end-ring $a$ forming a star connection, and at the other end to one phase of a supply not shown. The figure may be taken to represent one of several identical sections of a winding, or to represent a complete winding. Suppose that the winding, or each section of it, extends over an odd number of pole pairs for each of the pole numbers on which the motor is to run. This condition is indicated by the curves in the middle of the figure which may be taken to represent field distribution. For each pole number a point mid-way between corresponding bars of neighboring sections (or half way around the complete winding) will be in a field opposite in sign to that at the two bars considered. For instance if the bars AA, BB in the figure are the first bars of neighboring sections and they are in fields of positive sign, a point mid-way between them will be in a field of negative sign, and hence a bar at that point should carry a current opposite in direction to the current in the two end bars. Suppose such a bar inserted as shown in dotted lines. The direction of current in it enables it to be joined in series with the two end bars, as also shown dotted. Bars may similarly be added all around the elementary winding, the end ring being omitted; converting it into a drum winding with a pitch equal to half the length of a section, and having the same number of terminals as the original winding but twice as many bars. This is shown at the bottom of the figure.

Figure 7:
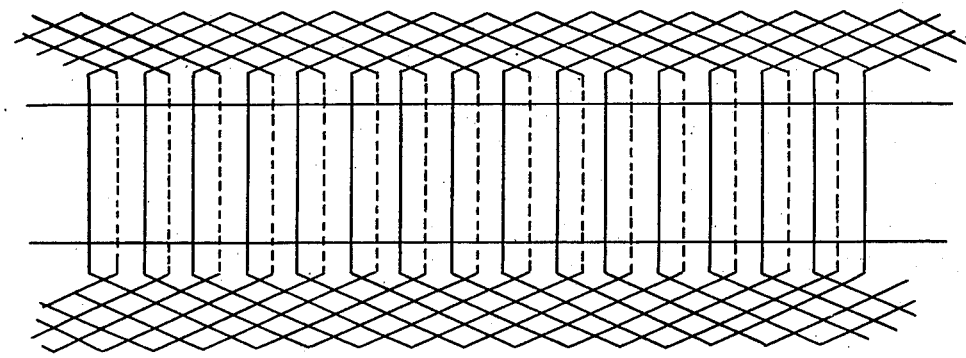
Fig. 7 shows a lap winding constructed by the method of Fig. 6.

Instead of connecting the above-mentioned three bars in series to form a wave winding, any two bars only differing in position by an odd number of pole pitches may only be connected in series to form a single drum would coil of long pitch and the coils so formed connected up in any manner desired so as, for instance, to form a mesh connected winding or in star. Fig. 7 shows a lap winding of this type. Any winding may be connected either in star or mesh, and the field form obtained corresponding to a given current per bar is independent of the star or mesh connection. The tapping currents and voltages, however will differ considerably according to which of these connections is used.

As at first stated the above described primary windings may be considered as cooperating with a squirrel cage secondary; but it is not necessary that the secondary member of the machine should have a squirrel cage winding. If desired its winding may be of any of the types described for the primary winding above, and it may be connected to slip-rings corresponding in number to the tappings. Such a machine may be connected through its slip-rings in cascade with other motors or with frequency converters or generators of commutator or other type. But if it is connected with a commutating apparatus such apparatus also needs to be of variable pole type unless recourse is had to switching apparatus such as described above with reference to Fig. 3 when it is desired to change the number of poles of the first machine. If the slip rings are connected to a source of direct current excitation the machine becomes a variable pole synchronous machine. It is further possible to build the armature with a commutator, for instance by the methods described below.

The following is an example of the design of a drum winding on the principles explained which will assist in showing the factors to which weight should be given. Suppose a motor is wanted to operate with 4, 6, 8, 10, 12, 14 and 16 poles. The principles that the number of phases of supply should be prime to all the numbers of pairs of poles, and that there should be at least two phases in the shortest pole pitch clearly point to the choice of say a 29 or a 31-phase supply. Suppose 31 be chosen. The approximate main dimensions of the machine can be estimated from general experience. The G. C. M. of the numbers of pole pairs to be used is 1, and the product of the number of phases in the shortest pole pitch used and the maximum number of poles is $2 \times 16 = 32$. Hence the winding may conveniently have 31 groups of bars and 31 tappings. Suppose that for the dimensions chosen it is convenient to disposed these in 93 slots. There will be three slots per group, each slot containing say two bars as in the usual two-layer winding. It remains to determine the best slot pitch for the winding.

Figure 9:
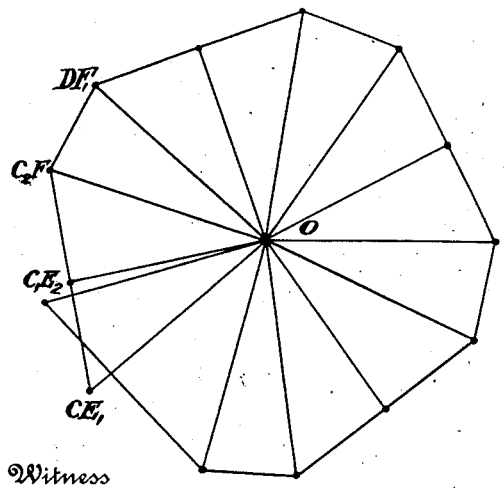
Figs. 8 and 9 illustrate a method by which the rotating field of the machines can be conveniently studied.
Figure 8:
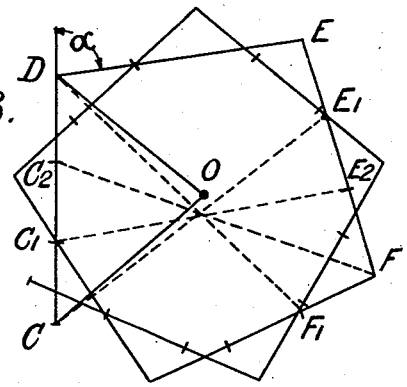

The selection of this is facilitated by the use of the method of studying a rotating field explained by Hellmund (*Transactions of the American Institute of Electrical Engineers*, 1908 "Graphical treatment of the rotating field"). Figs. 8 and 9 show how to plot out the flux density for one pole number, say for the 14-pole arrangement. The phase-difference between adjacent groups of bars in the 14-pole arrangement will obviously be $\frac{7}{31} \times 360°$. In Fig. 8 C D is a vector representing in magnitude and direction the magnitude and phase of any one current band due to the upper layer of the winding alone, due, that is to the upper conductors in three neighboring slots, the three equal parts into which the vector is divided indicating the ampere conductors due to the respective slots. D E, set off at an angle of $\frac{7}{31} \times 360°$ similarly represents the ampere-bars or magnetomotive force of the next band of the upper layer. The magnetomotive force of the whole winding can be plotted in similar manner. The figure shows a part only of the polygon which will be obtained. For the polygon does not close when the sum of its exterior angles $\alpha$ amount to approximately 360°—in fact, because the phase number is prime, not until the exterior angles total $7 \times 360°$. The ends of the vectors lie on a circle. A radial line from the center of this circle to any point in the polygon represents vectorially the magnitude and phase of the flux density in the air gap due to the upper layer of the winding alone at the corresponding point of the circumference of the machine. Thus O C represents the flux density in the teeth at say the right of slot 1 O D that on the right of slot 4 and so on. The lower layer of the winding, however, has so far been disregarded. Suppose the pitch it is desired to find is 1—8. Consideration of a winding diagram such as those of Figs. 4 and 5 will show that the lower layer of conductors in slots 1, 2 and 3 will be carrying currents equal and opposite to those in the upper layer of conductors in slots 8, 9, 10; or if the pitch is 10 the lower layer currents will be equal and opposite to the upper layer currents of slots 10, 11, 12. Taking 8 as the pitch the flux density beside slot 1 will be the difference of the vectors O C and $OE_1$. This difference is represented vectorially by $C E_1$ which, therefore, represents the resultant flux density beside slot 1 due to the whole winding.

In Fig. 9 vectors O—$C E_1$, O—$C_1 E_2$, O—$C_2 F$, O—$D F_1$ etc. are set out from a center O equal and parallel to the vectors $C E_1$, $C_1 E_2$, $C_2 F$, $D F_1$, etc., of Fig. 8 and the junction of their ends gives a second polygon of which the radii represents resultant flux density. Points on this polygon diametrically opposite represent points distant by a pole pitch in the actual machine. Because the pitch chosen is not an exact multiple of the tapping pitch the polygon of Fig. 9 has twice as many sides as that of Fig. 8, being similar to it but with the corners cut off. Similar polygons can be drawn for each of the other pole numbers, and then similar sets of polygons can be drawn for different assumed slot pitches. That slot pitch should be chosen for which the polygons corresponding to Fig. 9 are as closely approximate to a circle as possible for every pole number, and at the same time have for each pole number the largest possible diameter relative to the vector representing the current band. When the pitch is chosen the further diagrams developed by Hellmund may if desired be drawn to show the field distribution etc. This method of study has the advantage of bringing to light so much of the results of a proposed design that the correct designing of the drum winding required for a machine according to the invention is only more elaborate and no more difficult than the design of a winding for a standard machine.

As already indicated by the drawings I prefer to obtain currents of the proper phase displacement for the zones of a winding from a polyphase supply of sufficiently large number of phases to afford the necessary selection. It is not necessary that this supply should be taken directly from a generator of the same number of phases. Any desired number of phases can readily be obtained from a two or three phase supply, by the method indicated in Fig. 3, which may be explained as follows:—I employ a mesh connected winding on my transformer, which, if no considerable voltage transformation is required, may be the primary winding. The E. M. F.'s in this in the case of a three-phase transformer are represented vectorially by the equilateral triangle P Q R in Figs. 10 and 11. A circle S approximating as closely as possible to the triangle, for instance trisecting its sides is divided into as many parts as there are to be phases. From each division a line is drawn parallel to one of the sides of the triangle to intersect another side, for instance $x\ y$ parallel to P R. If a secondary winding X Y on the part P R of the transformer having a number of turns proportional to the length $x\ y$ is joined to the primary winding Q R at $y$ the E. M. F.'s of the two will compound into an E. M. F. X having phase represented by O$x$. In the same way each of the other phases can be built up.

Figure 12:
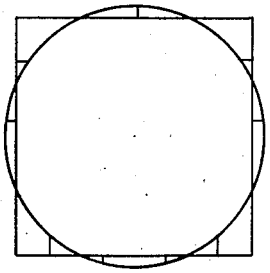
Figs. 10, 11 and 12 illustrate methods of obtaining a polyphase supply of large number of phases from the ordinary 3- or 2-phase supply.

The same method enables a large number of phases to be obtained from a two-phase supply, but in this case the circle intersects the sides of a square as shown in Fig. 12, the intercept within the circle being approximately $\sqrt{2}$ times the outer parts.

A slight variation in the motor voltage can be secured without much loss of economy by variation of the size of the circle in these figures. If a considerable voltage transformation is necessary as between mains and motor, the transformer will have a high voltage primary, shown dotted in Fig. 10, a low voltage secondary connected in mesh and represented by P Q R and auxiliary secondaries such as X Y.

Figure 13:
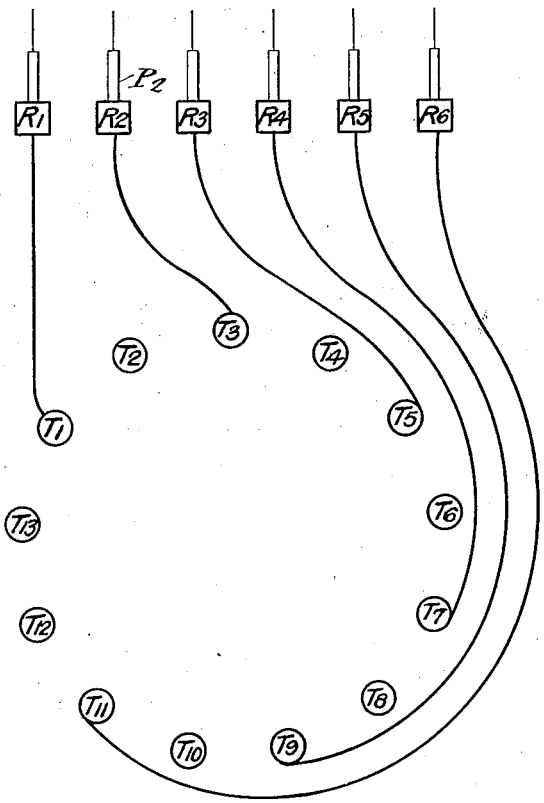
Fig. 13 shows diagrammatically one arrangement of the controller.

Fig. 13 shows an arrangement of the controller equivalent to that of Fig. 3, in which there are as many sets of fixed contacts as there are pole numbers, and in each set as many contacts as there are motor terminals; these contacts are connected permanently to the appropriate supply terminals, arranging the connections in parallel planes, all those to be connected to one terminal in one plane. $T_1\ T_2\ \ldots$ are conducting rods at right angles to the paper arranged say in a circle, and each connected at one end to a terminal of the supply. $R_1\ R_2\ \ldots$ in part of one row of a field of fixed contacts of which the first row corresponds to the first pole number, the second to the second pole number and so on. The connections between these contacts and the bus bars $T_1\ T_2\ \ldots$ will be understood from Fig. 3 and from the single row shown. A row of brushes of which $P_2$ is one, each connected to one motor tapping, are movable at right angles to the plane of the paper over the field of contacts to effect the pole changes.

Figure 14:
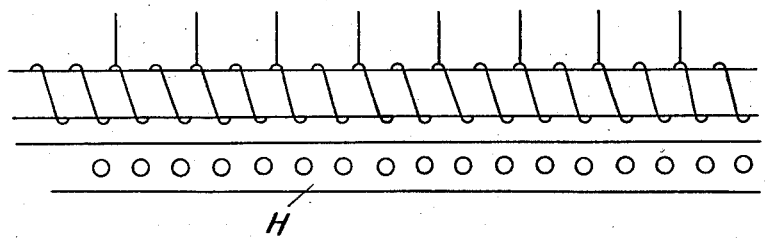
Figs. 14 and 15 illustrate the difference in structure between a variable polarity induction motor according to the present invention and the corresponding fixed polarity type.
Figure 15:
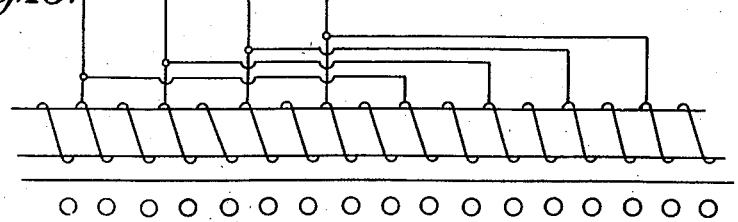

So far the invention has been described only in its application to induction motors, but it can be applied to all other types of dynamo electric machine. And the change that is in effect made in converting machines of other types of one pole number into variable pole machines according to the invention is of the same nature as the change necessary to convert an ordinary induction motor into an induction motor according to the invention. Fig. 14 shows diagrammatically an induction motor according to the invention with a ring winding having eight tappings by which an 8-phase supply can be connected to it so as to produce either 2 poles or 4 poles. H is a squirrel cage secondary. Fig. 15 represents an ordinary induction motor having a fixed pole number of 4 poles. Its winding has the same tappings but numbers 5 to 8 are cross connected to numbers 1 to 4 so that the motor has but four terminals for connection to a 2-phase supply. The change that has been made, therefore, in applying the invention is to omit the cross connections and to vary the pole number of the motor by varying the phase difference between the eight terminals. The cross connections being no longer necessary the winding need not fulfil the conditions that they impose; and, as has been pointed out, the best number of phases in the supply is a prime number which in none of its connections to the motor will admit of cross connections being inserted. In other words Fig. 14 is not the best design for a variable pole motor, just as Fig. 15 is not the best design for a 2-phase 4-pole motor, but both are possible designs and show how much of the structure of the dynamo electric machine is common to the invention and to existing machines.

Figure 10:
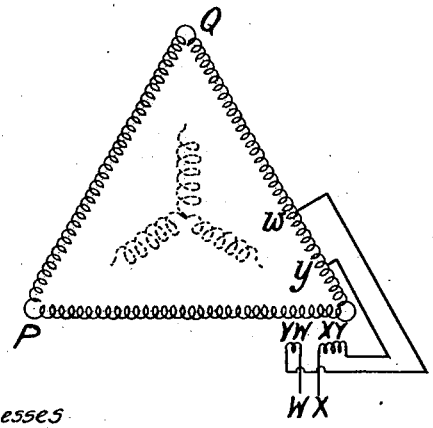
Figure 11:
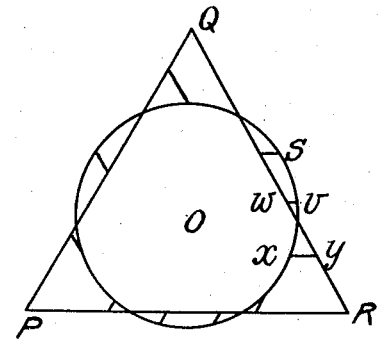

If the motor of Fig. 14 is provided with a wound secondary member tapped off to a number of slip rings in accordance with the principles described above and if these slip rings be fed with direct current at appropriate constant E. M. F.'s proportional in magnitude to the projections upon a straight line of the vector E. M. F.'s $Ox$ $Ow$ . . . Fig. 10, the motor operates as a synchronous motor as explained above.

It is well known that the ordinary induction motor can be converted into a commutator motor by the addition of a commutator to its rotor winding with brushes upon it joined to the mains directly or through transformers, and that this addition makes phase compensation and self-excitation possible. In precisely the same way the induction motor of the present invention can have a commutator and brushes added to it and operate as a variable pole commutator machine. Fig. 16, for instance, shows a shunt commutator machine so constructed, the brushes $j$, $k$, $m$, $p$, being connected to the mains 1, 2, 3, 4 through transformers $T_1$, $T_2$, $T_3$, while Fig. 17 shows a substantially identical machine provided with cross connections which convert it into the known shunt commutator machine of fixed pole number. If collector rings are attached to tappings on the armature winding of Fig. 16, chosen according to the principles explained, a frequency converter is obtained which may for a particular setting of brushes operate as a rotary converter. A switching operation must be performed on these collector rings, for instance, by such controllers as shown in Fig. 3, whenever the pole number is changed. Fig. 18 illustrates in the same diagrammatic manner a variable pole series commutator machine with star-connected stator winding $Sw$ the rotor winding $Rw$ being connected into the star point. Fig. 19 shows a shunt conduction commutator motor, of which the neutralizing winding $Nw$ is shown in full line and the field winding $Sw$ dotted. There must be no connection between adjacent sections of the neutralizing winding, but on the contrary it is star-connected, the rotor taking the place of the star point, and this must be borne in mind when designing the neutralizing winding as not every type of winding is capable of being arranged to give the required distribution of ampere conductors when arranged in star. Suitable types are the ring, bar, and long pitch single layer drum. As is well known there is a conductive type of machine corresponding to each inductive type and this holds good of variable pole machines. Fig. 20 is a diagram of the ordinary form of phase advancer, and Fig. 21 shows the connections of a phase advancer adapted for use on different pole numbers, for instance for use in connection with any of the induction motors hitherto described.

It will be obvious from these examples how many type of machine of one pole number may be built as a variable pole machine.

Any of the motors constructed according to the invention will, if its rotor is mechanically driven, generate current in well known fashion and so constitute a variable pole generator.

The motor of Fig. 19 for instance if mechanically driven forms a generator suitable for supplying any of the motors according to the invention.

What I claim as my invention is:—

1. In a variable pole dynamo-electric system, the combination of a primary member and a winding thereon consisting of a fixed number of sections, a source of supply of polyphase electric current adapted to give a number of phases greater than five, and means for connecting the successive adjacent sections of the primary winding to the phase terminals of the source of supply either in one succession for one pole number differing in phase by an angle which is one integral multiple of the quotient of 360 degrees divided by the total number of sections in said primary winding, or in another succession for another pole number differing in phase by an angle which is another integral multiple of the said quotient, whereby adjacent sections of the primary winding are excited by currents differing in phase by smaller or larger angles with the production of fewer or greater numbers of poles in said primary member, according to the setting of said connecting means.

2. In a variable pole dynamo-electric system, the combination of a primary member and a winding thereon consisting of a fixed number of sections, a source of supply of polyphase electric current adapted to give a number of phases greater than 5, and means for connecting the successive adjacent sections of the primary winding either to successive phases of the source of supply (0, 1, 2, 3 . . .) or to alternate phases of the source of supply (0, 2, 4, 6 . . .) or to every third phase of the source of supply (0, 3, 6 . . .), and so forth, whereby adjacent sections of the primary winding are excited by currents differing in phase by smaller or larger angles, and the primary member has a corresponding smaller or larger number of poles induced therein.

3. In a variable pole dynamo-electric system adapted to operate with not less than three different numbers of pole pairs, the combination of a primary member and a winding thereon consisting of a fixed number of sections, a source of supply of polyphase electric current adapted to give a number of phases greater than five, and means for connecting the successive adjacent sections of the primary winding to the phases of the polyphase source of supply in different successions such that, for one number of pole pairs the phases connected to successive sections of the primary winding differ from one another by one angle, while for a greater number of pole pairs the phases connected to successive sections of the primary winding differ from one another by a correspondingly greater angle, and so forth, such differences of phase angle between phases of the source of supply connected to successive sections of the primary winding for different pole numbers being all integral multiples of the quotient of 360 degress divided by the total number of sections in said primary winding.

4. In a variable pole dynamo-electric system adapted to operate with not less than three different numbers of pole pairs, the combination of a primary member and a winding thereon consisting of a fixed number of sections, a source of supply of polyphase electric current adapted to give a number of phases prime to all the numbers of pairs of poles with which the system is required to operate, and means for connecting the successive adjacent sections of the primary winding to the phases of the polyphase source of supply in different successions such that, for the different numbers of pole pairs, the phases connected to successive sections of the primary winding differ from one another by different angles, such angles of difference of phase being always integral multiples of the quotient of 360 degrees divided by the total number of sections in said primary winding.

5. In a variable pole dynamo-electric system, the combination of a primary member and a drum winding thereon made up of a plurality of sections connected as a regular polyphase winding adapted to receive currents of as many independent phases as there are sections in the winding, terminals to said sections, a source of polyphase electric current adapted to give a number of phases greater than five, and means for connecting the terminals of successive adjacent sections of said drum winding to the phase terminals of the source of supply in a plurality of different successions, each succession giving a different pole number, the steps of phase of one such succession differing from one another by one phase angle, and the steps of phase of other successions differing by other phase angles, all such phase angles being an integral multiple of the quotient of 360 degrees divided by the total number of sections of said drum winding.

6. In a variable pole dynamo electric system, the combination of a primary member and a drum winding thereon made up of a plurality of sections connected as a regular polyphase winding adapted to receive currents of as many independent phases as there are sections in the winding, terminals to said sections, a source of polyphase electric current adapted to give a number of phases prime to all the numbers of pairs of poles with which the system is required to operate, and means for connecting the terminals of successive adjacent sections of said drum winding to the phase terminals of the source of supply in a plurality of successions in each of which the steps of phase differ from one another by a phase angle which is less for a smaller pole number and greater for a larger pole number, such phase angles being always an integral multiple of the quotient of 360 degrees divided by the total number of sections of said drum winding.

7. In a variable pole dynamo-electric system, the combination of a primary member, a drum winding thereon divided into a fixed number of sections each section being composed of a plurality of subsections connected in series and disposed on parts of the circumference of the primary member requiring currents of substantially the same phase for all operative pole numbers, a source of supply of polyphase electric current adapted to give a number of phases greater than five, and means for connecting adjacent sections of said drum winding to the phase terminals of said source of supply in different successions differing in phase by different phase angles for each required pole number, whereby adjacent sections of the drum winding are excited by currents differing in steps of phase by smaller or larger phase angles according to the particular pole number.

8. In a variable pole dynamo-electric system, the combination of a primary member and a winding thereon consisting of a fixed number of sections, a source of supply of polyphase electric current adapted to give a number of phases greater than five, and means for connecting successive adjacent sections of the primary winding to the phase terminals of the source of supply either in one succession for one pole number differing in steps of phase by an angle which is one integral multiple of the quotient of 360 degrees divided by the total number of sections in said primary winding, or in another succession for another pole number differing in steps of phase by an angle which is another integral multiple of the said quotient, said connecting means comprising a set of conducting rods, a field of fixed contacts disposed in sets adjacent to said rods, connecting wires joining the contacts of one such set to the said rods in one sequence differing in phase by one phase angle, and joining the contacts of another such set to said rods in another sequence differing in phase by another phase angle, and a set of movable contact members adapted to bear upon any one of said sets of fixed contacts and to connect the phase terminals of the source of supply through such set of contacts with the respective sections of said primary winding in the required sequence.

9. In a variable pole dynamo-electric system, the combination of a primary member and a winding thereon consisting of a fixed number of sections, a source of supply of electric current comprising a transformer adapted to give polyphase currents of a number of phases greater than five from a line supply of a less number of phases, and means for connecting the successive adjacent sections of the primary winding to the phase terminals of the source of supply either in one succession for one pole number differing in steps of phase by an angle which is one integral multiple of the quotient of 360 degrees divided by the total number of sections in said primary winding, or in another succession of another pole number differing in steps of phase by an angle which is another integral multiple of the said quotient.

In testimony whereof I sign my name to this specification in the presence of two subscribing witnesses.

FREDERICK CREEDY.

Witnesses:
RD. B. NICHOLLS,
FRED HAMMOND.